United States Patent [19]

Sakuma et al.

[11] Patent Number: 5,324,525
[45] Date of Patent: Jun. 28, 1994

[54] ANTI-ADHESION AGENT TO WATER BORNE ORGANISMS

[75] Inventors: Shuji Sakuma; Kiminori Atsumi; Keijiro Fujita, all of Tokyo, Japan

[73] Assignee: Kabushiki Kaisha Sangi, Tokyo, Japan

[21] Appl. No.: 52,298

[22] Filed: Apr. 26, 1993

Related U.S. Application Data

[62] Division of Ser. No. 846,475, Mar. 6, 1992, abandoned.

[30] Foreign Application Priority Data

Mar. 26, 1991 [JP] Japan .................. 3-084448

[51] Int. Cl.$^5$ .................. A01N 59/06; A01N 59/26; C01D 5/14; C01D 5/16
[52] U.S. Cl. .................. 424/602; 424/601; 424/604; 424/618; 424/630; 424/641; 424/646; 424/421; 106/18.31; 106/18.36; 106/15.05; 210/749; 210/764
[58] Field of Search .............. 424/602, 601, 604, 618, 424/630, 641, 646, 421; 106/18.31, 18.36, 15.05; 210/749, 764

[56] References Cited

U.S. PATENT DOCUMENTS 5,151,122  9/1992  Atsumi et al. .................. 424/421

FOREIGN PATENT DOCUMENTS

WO89/10691 11/1989 PCT Int'l Appl.

*Primary Examiner*—Allen J. Robinson
*Assistant Examiner*—John D. Pak
*Attorney, Agent, or Firm*—Finnegan, Henderson, Farabow, Garrett & Dunner

[57] ABSTRACT

Disclosed is an agent for preventing the adhesion of water borne organisms, in which a calcium phosphate-based compound is made to carry, by adsorption and/or ion exchange, preferably not more than 15% by weight of at least one metal or metal ion selected from the group consisting of silver, copper, zinc and nickel. Also disclosed is a paint in which 0.1%–30% by weight of this agent is mixed.

2 Claims, No Drawings

ANTI-ADHESION AGENT TO WATER BORNE ORGANISMS

This application is a division of application Ser. No. 07/846,475, filed Mar. 6, 1992, now abandoned.

BACKGROUND OF THE INVENTION

1. Field of the Invention

This invention relates to an anti-adhesion agent to water borne organisms, and to a paint containing such an agent for use in preventing the adhesion of water borne organisms, such as shellfish and seaweed, to such objects as the hull of ships, fishing nets, underwater structures and underwater equipment. More particularly, the invention relates to a calcium-phosphate compound carrying at least one metal or metal ion selected from the group consisting of silver, copper, zinc and nickel, and to a paint containing such a compound.

2. Description of the Prior Art

Shellfish and seaweeds such as barnacles, oysters, muscles hydrozoa, tube worm, sea moss, sea squirts, laver, green laver and others adhere to and breed on equipment and structures in constant contact with water, examples of which are facilities that are immersed in water, such as the hull of ships, fishing nets and buoys, submerged structures such as dam facilities and bridge supports, and water conduits for cooling a variety of industrial apparatus. The adhesion and propagation of such organisms on ships can lead to losses in revenue due to a reduction in traveling speed, an increase in fuel consumption, cleaning of the ship's bottom and suspension of service and so on. In underwater structures, the result can be inconvenience in terms of handling and operation. Unexpected difficulties that can occur in water conduits include blockage of the waterway and a decrease in the amount of water that can be carried.

In order to prevent such difficulties caused by the adhesion and propagation of such harmful water organisms, the practice heretofore has been to use an antifouling coating containing an oxide or an organic tin compound such as bis (tri-butyltin) oxide. However, even when such a coating is effective in preventing the adhesion of water organisms, the coating elutes into the water, and the tin compound is adsorbed by and accumulates in fish and shellfish. Copper compounds alone are inappropriate since their ions elute readily in water. Thus, such types of coatings create environmental pollution problems. Accordingly, there is a need to develop a favorable anti-adhesion agent to water borne organisms, and especially one that is not environmentally polluting.

SUMMARY OF THE INVENTION

Accordingly, an object of the present invention is to provide an anti-adhesion agent to water borne organisms, wherein the agent is effective in preventing the adhesion of water borne organisms and is so engineered that metals or metal ions will not elute into water, thus rendering the agent safe for use since there is no fear of environmental pollution.

Another object of the present invention is to provide a paint containing the above-described anti-adhesion agent.

According to the present invention, the foregoing objects have been attained though a variety of investigations. As the result of these investigations, it has been confirmed that an antibacterial calcium phosphate-based compound, in which a calcium-phosphate compound is made to carry an antibacterial metal or metal ion such as silver, copper, zinc or nickel by adsorption or ion exchange, exhibits an action that prevents the adhesion of water borne organisms, and that the calcium phosphate-based compound will not produce environmental pollution since almost none of the carried metal or metal ion elutes into water.

The calcium phosphate-based compound used in the present invention is selected from calcium triphosphate and hydroxyapatite. Hydroxyapatite has the composition $Ca_{10}(PO_4)_6(OH)_2$ and is the main ingredient in bones and teeth. It is known to readily adsorb protein and fats and to exhibit an ion-exchange capability, and is synthesized from a phosphate and a calcium salt. However, the synthesis of hydroxyapatite having a stoichiometric molar ratio, i. e., $Ca/P = 10/6$, from a calcium salt and a phosphate is accompanied by certain difficulties and is uneconomical. However, simulations of hydroxyapatite having a Ca/P molar ratio of 1.4–1.8 for example can readily be synthesized by changing the molar ratio of the calcium salt and phosphate used. In this invention, these simulations also can be used in the same manner as hydroxyapatite. Accordingly, the hydroxyapatite in the present invention covers also simulations of hydroxyapatite having a Ca/P molar ratio of 1.4–1.8.

The antibacterial calcium phosphate-based compound is obtained by causing a calcium phosphate-based compound to carry, by an ordinary method relying upon adsorption and/or ion exchange, an aqueous solution of at least one metallic salt selected from metals having antibacterial property, namely silver, copper, zinc and nickel. Alternatively, when a calcium phosphate-based compound is produced from a calcium salt and a phosphate by an ordinary method, the aforementioned antibacterial calcium phosphate-based compound can be obtained by a method such as causing an aqueous solution of a metallic salt to coexist and combine in the crystals which precipitate. The calcium phosphate-based compound thus obtained is used upon being washed with water, dried and then pulverized. Virtually no elution of the metal or metal ions into water has been found.

As for the amount of metal or metal ion that can be carried, any amount up to the amount whereby saturated adsorption or ion exchange of the calcium phosphate-based compound can be achieved. However, when the compound is made to carry too large an amount, elution of the metal or metal ion into the water may occur and discoloration of the paint may result if the compound is applied upon being mixed with paint. In such cases of high load levels, the calcium phosphate-based compound made to carry the metal or metal ion should be heat-fired at a high temperature, preferably a temperature of 800° C. or more. It is believed that the bonding between the carried metal and the calcium phosphate-based compound is further strengthened by such heat-firing and that the calcium phosphate-based compound contracts to halt the elution of the carried metal even when the compound comes into contact with water. In general, the amount of metal or metal ion carried preferably is controlled so as to be less than 15% by weight with respect to the calcium phosphate-based compound. It is possible to readily control the amount of metal or metal ion carried by changing the concentration of the aqueous solution of metallic salt used.

Since the antibacterial calcium phosphate-based compound thus obtained is readily dispersed at a desired ratio in any paint used heretofore and available on the market, it can be used upon being dispersed in and mixed with paint. However, in consideration of the effectiveness of preventing the adhesion of water borne organisms and a physical change in the coating film, the compound is dispersed in paint at a rate of 0.1%–30% by weight, preferably 1%–20% by weight, in order to be used properly. An object coated with the paint thus obtained will not pollute the environment, even when immersed in water, since the carried metal or metal ion will not elute into the water.

EXAMPLE

Preparation of an Anti-Adhesion Agent to Water Borne Organisms

Aqueous solutions containing nitrates of various metals were added dropwise to columns filled with calcium triphosphate or hydroxyapatite, the columns were washed at completion of the dropwise addition of the aqueous solutions, the free salts were removed and the calcium triphosphate or hydroxyapatite was extracted and then dried. The extractants were subsequently pulverized and the contents of the various salts were measured to obtain the following water borne organisms anti-adhesion agents, which were used in the experiments set forth below:

(1) antibacterial hydroxyapatite carrying 2% by weight of silver and 8% by weight of zinc;

(2) antibacterial hydroxyapatite carrying 3% by weight of copper;

(3) antibacterial hydroxyapatite carrying 2% by weight of copper and 1% by weight of silver;

(4) antibacterial calcium triphosphate carrying 1% by weight of copper;

(5) antibacterial hydroxyapatite carrying 2% by weight of copper and 2% by weight of zinc; and (6) antibacterial hydroxyapatite carrying 4.5% by weight of copper and 0.5% by weight of nickel.

EXAMPLE 1

One gram of each of the water borne organism anti-adhesion agents (1)-(6) was added separately to 100 ml of distilled water and stirring was performed for 24 hrs. Thereafter, the concentration of the metal ion in each solution was measured using an atomic-absorption photometer, and the amount of elution of metal ion was determined.

EXAMPLE 2

The water borne organism anti-adhesion agents (1)-(6) were heat-fired at 850° C. and one gram of each pulverized sample was added separately to 100 ml of distilled water. Then, through a process similar to that of Example 1, the amount of elution of metal ion was determined.

Table 1 shows the results of measuring the amounts of elution obtained in accordance with Examples 1 and 2.

TABLE 1

(numerical value: weight %)

| WATER BORNE ORGANISM ANTI-ADHESION AGENT | SILVER | ZINC | COPPER | NICKEL |
| --- | --- | --- | --- | --- |
| 1)-1 | <0.01 | <0.2 | — | — |
| 1)-2 | — | — | <0.1 | — |
| 1)-3 | <0.01 | — | <0.1 | — |
| 1)-4 | — | — | <0.1 | — |
| 1)-5 | — | <0.2 | <0.1 | — |
| 1)-6 | — | — | <0.1 | <0.2 |
| 2)-1 | <0.01 | <0.2 | — | — |
| 2)-2 | — | — | <0.1 | — |
| 2)-3 | <0.01 | — | <0.1 | — |
| 2)-4 | — | — | <0.1 | — |
| 2)-5 | — | <0.2 | <0.1 | — |
| 2)-6 | — | — | <0.1 | <0.2 |

EXAMPLE 3

Paint was prepared.

| Base Paint Material Name | Composition (% by weight) |
| --- | --- |
| No. 2 Ship varmish | 50 |
| Red iron oxide | 12 |
| Talc | 16 |
| Barium sulfate | 10 |
| Orben | 0.5 |
| Disparlon or Dislon | 1.5 |
| Xylene | 10 |
| Total: | 100 | in which iosin, 55.0%, polymerized linseed oil, 15.0%, xylene 25.0%, and isobutyl alcohol 5.0% are contained by weight.

Paint was prepared in accordance with the ratio set forth above and the water borne organism anti-adhesion agents of Examples 1 and 2 were blended separately with this paint to produce paints for the bottoms of ships.

1. 1% of the water borne organism anti-adhesion agent of Example 1)-1 was added to and mixed with the aforementioned base paint.

2. 3% of the water borne organism anti-adhesion agent of Example 1)-2 was added to and mixed with the aforementioned base paint.

3. 5% of the water borne organism anti-adhesion agent of Example 1)-3 was added to and mixed with the aforementioned base paint.

4. 10% of the water borne organism anti-adhesion agent of Example 1)-4 was added to and mixed with the aforementioned base paint.

5. 20% of the water borne organism anti-adhesion agent of Example 1)-5 was added to and mixed with the aforementioned base paint.

6. 0.2% of the water borne organism anti-adhesion agent of Example 1)-6 was added to and mixed with the aforementioned base paint.

7. 1% of the water borne organism anti-adhesion agent of Example 2)-1 was added to and mixed with the aforementioned base paint.

8. 1% of the water borne organism anti-adhesion agent of Example 2)-2 was added to and mixed with the aforementioned base paint.

9. 1% of the water borne organism anti-adhesion agent of Example 2)-3 was added to and mixed with the aforementioned base paint.

10. 1% of the water borne organism anti-adhesion agent of Example 2)-4 was added to and mixed with the aforementioned base paint.

11. 1% of the water borne organism anti-adhesion agent of Example 2)-5 was added to and mixed with the aforementioned base paint.

12. 1% of the water borne organism anti-adhesion agent of Example 2)-6 was added to and mixed with the aforementioned base paint.

EXAMPLE 4

A test of water borne organism anti-adhesion capability was conducted.

Steel plates having dimensions of 300×200 mm were undercoated with No. 1 ship-bottom paint, and the plates were then spray-coated with ship-bottom paints according to Example 3. These plates were then immersed in seawater for six months to observe the state of adhesion of organisms. A similar steel plate spray-coated with the base paint of Example 3 devoid of the antibacterial agent was prepared and used as a control. This plate also was immersed in seawater for six mounts.

The results of this test are as shown in Table 2.

TABLE 2

| EXAMPLE | ADHERING ORGANISM | IMMERSION PERIOD | | |
|---|---|---|---|---|
| | | 1 MONTH | 3 MONTHS | 6 MONTHS |
| 3)-1 | SHELLFISH | A | A | A |
| | SEAWEED | A | A | A |
| 3)-2 | SHELLFISH | A | A | A |
| | SEAWEED | A | A | A |
| 3)-3 | SHELLFISH | A | A | A |
| | SEAWEED | A | A | A |
| 3)-4 | SHELLFISH | A | A | A |
| | SEAWEED | A | A | A |
| 3)-5 | SHELLFISH | A | A | A |
| | SEAWEED | A | A | A |
| 3)-6 | SHELLFISH | A | A | A |
| | SEAWEED | A | A | A |
| 3)-7 | SHELLFISH | A | A | A |
| | SEAWEED | A | A | A |
| 3)-8 | SHELLFISH | A | A | A |
| | SEAWEED | A | A | A |
| 3)-9 | SHELLFISH | A | A | A |
| | SEAWEED | A | A | A |
| 3)-10 | SHELLFISH | A | A | A |
| | SEAWEED | A | A | A |
| 3)-11 | SHELLFISH | A | A | A |
| | SEAWEED | A | A | A |
| 3)-12 | SHELLFISH | A | A | A |
| | SEAWEED | A | A | A |
| CONTROL | SHELLFISH | B | B | C |
| | SEAWEED | B | C | C |

A: NO ADHERING ORGANISMS
B: SOME SCATTERED ADHERING ORGANISMS
C: VERY MANY ADHERING ORGANISMS OVER ENTIRE SURFACE

The agent for preventing the adhesion of water borne organisms according to the present invention does not allow metals to elute and therefore is safe to use. Accordingly, the agent not only may be used as a paint but also can be mixed with fishing nets and with cement so as to be applied to marine structures.

Other features and advantages of the present invention will be apparent from the following description taken in conjunction with the accompanying drawing, in which like reference characters designate the same or similar parts throughout the figures thereof.

What is claimed is:

1. A paint for preventing adhesion of water borne organisms, in which 0.1%–30% by weight of an anti-adhesion agent for preventing adhesion of water borne organisms is mixed with a paint, said anti-adhesion agent consisting essentially of a calcium phosphate-based compound selected from the group consisting of calcium phosphate and hydroxyapatite, said calcium phosphate-based compound carrying at least one metal or metal ion selected from the group consisting of silver, copper, zinc and nickel.

2. A paint for preventing adhesion of water borne organisms, in which 0.1%–30% by weight of an anti-adhesion agent for preventing adhesion of water borne organisms is mixed with a paint, said anti-adhesion agent consisting essentially of a heat-fired upon calcium phosphate-based compound selected from the group consisting of calcium phosphate and hydroxyapatite, said calcium phosphate-based compound carrying at least one metal or metal ion selected from the group consisting of silver, copper, zinc and nickel.

* * * * *